Figure 1:
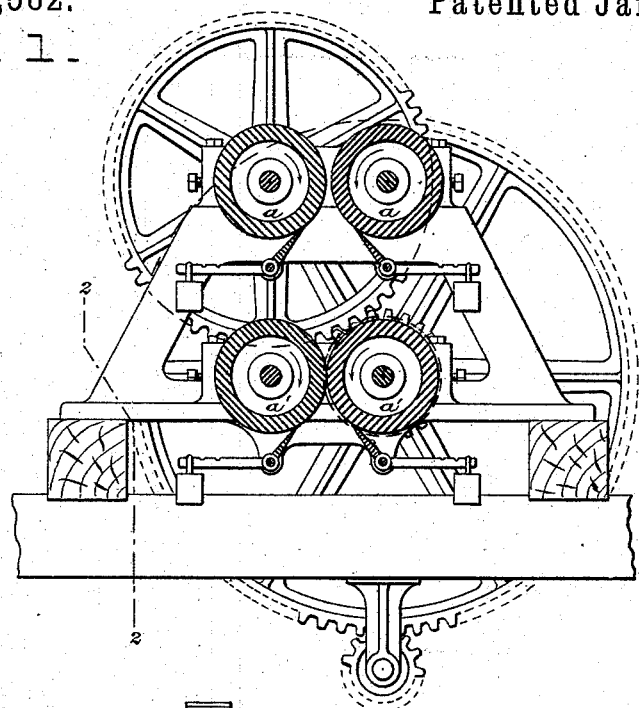

(No Model.) 5 Sheets—Sheet 1.

A. DIMPFL.
MANUFACTURE OF BRICKS, TILES, &c.

No. 291,582. Patented Jan. 8, 1884.

WITNESSES:

INVENTOR:

By his Attorneys, (No Model.) 5 Sheets—Sheet 2.
A. DIMPFL.
MANUFACTURE OF BRICKS, TILES, &c.
No. 291,582. Patented Jan. 8, 1884.
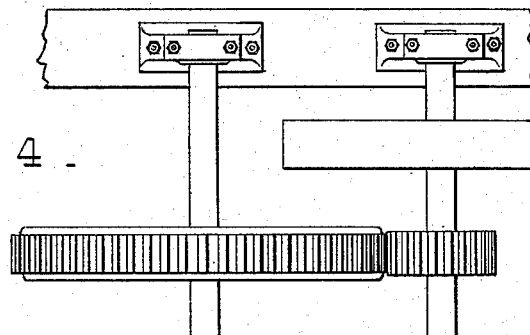
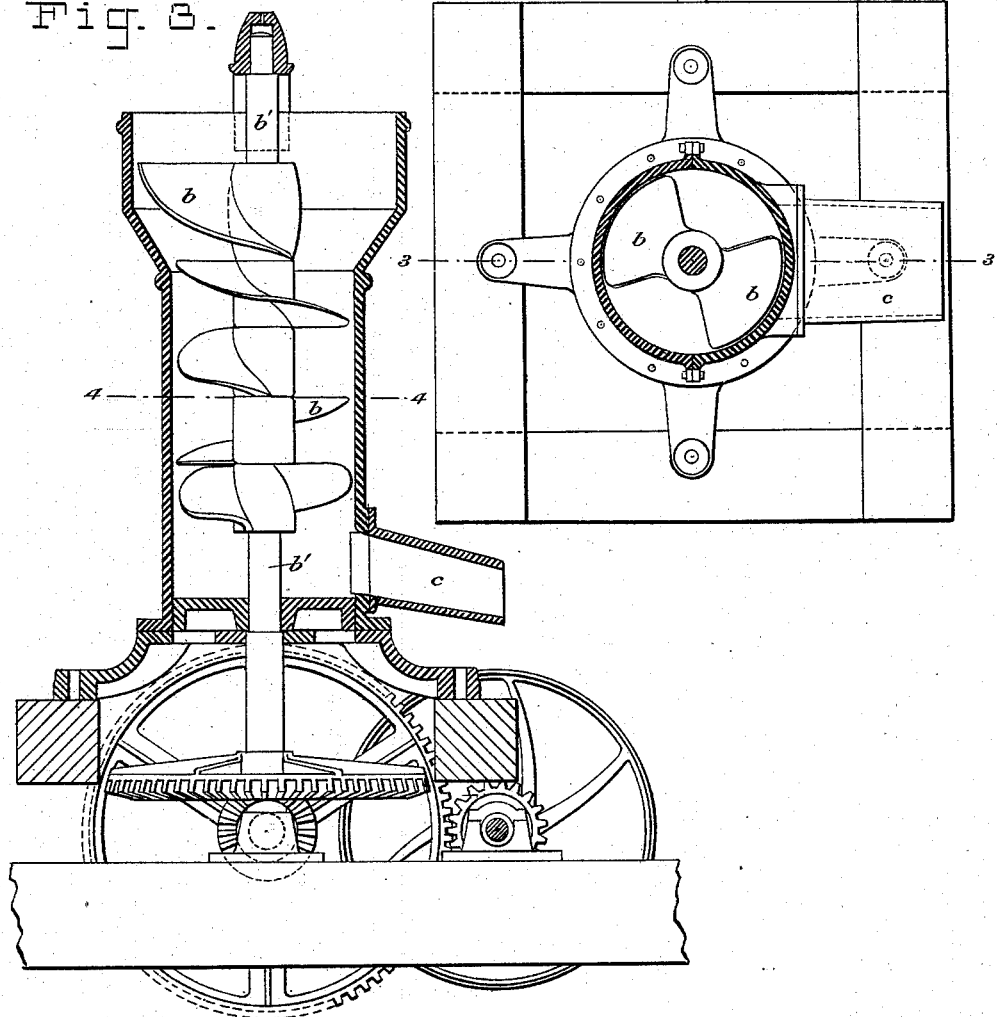
WITNESSES:
INVENTOR:
Anton Dimpfl
By his Attorneys,
Burke, Fraser & Connell

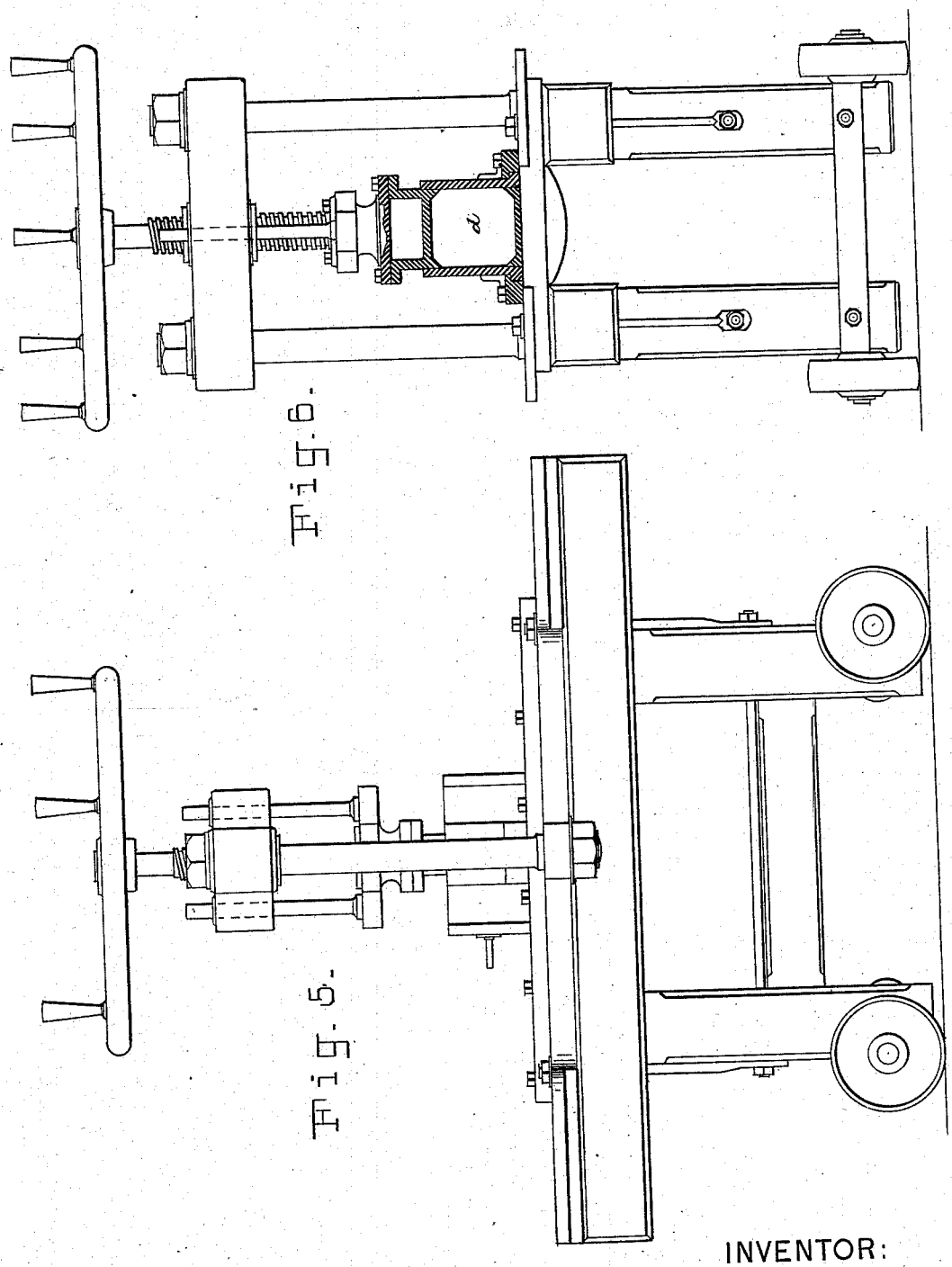

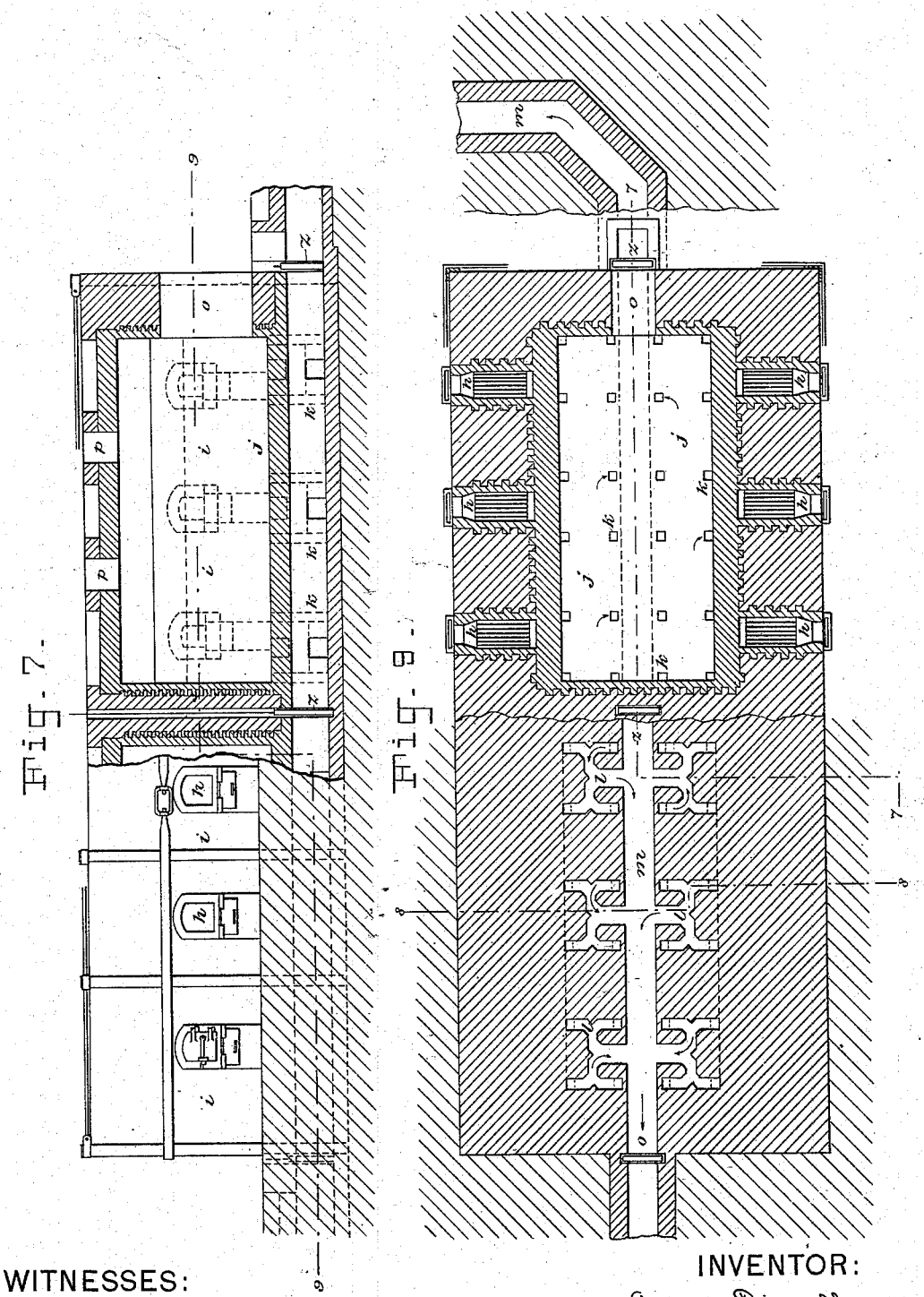

(No Model.) 5 Sheets—Sheet 5.

A. DIMPFL.
MANUFACTURE OF BRICKS, TILES, &c.

No. 291,582. Patented Jan. 8, 1884.

WITNESSES:
E. B. Bolton
Geo. H. Fraser

INVENTOR:
Anton Dimpfl
By his Attorneys,
Burke, Fraser & Komnett

UNITED STATES PATENT OFFICE.

ANTON DIMPFL, OF MUNICH, BAVARIA, GERMANY, ASSIGNOR TO MICHEL POLETTI, OF HOBOKEN, NEW JERSEY.

MANUFACTURE OF BRICKS, TILES, &c.

SPECIFICATION forming part of Letters Patent No. 291,582, dated January 8, 1884.

Application filed January 27, 1883. (No model.) Patented in France September 20, 1875, No. 109,657; in Belgium September 24, 1875, No. 37,928, and in England July 14, 1876, No. 2,887.

*To all whom it may concern:*

Be it known that I, ANTON DIMPFL, machinist, a resident of Munich, in Bavaria, Germany, have invented certain new and useful Improvements in the Manufacture of Bricks, Tiles, &c., of which the following is a specification.

This invention has for its object improvements in the manufacture of bricks, slabs, and other articles made of clay, and in means or apparatus employed therein. For this purpose the clay is mixed or tempered with hot water obtained, by preference, by passing the waste steam of a steam-engine into a tank containing the water to be heated. The water thus heated is conveyed by pipes or tubes provided with regulating-cocks to the clay to be tempered or mixed. The clay thus soaked is lifted by means of an endless or continuous elevator to a double crushing or grinding mill, in which the clay is first crushed or ground between one pair of cylinders and then falls down between another pair of cylinders, where it is ground or triturated a second time. The clay is then submitted to the action of a vertical pug-mill, consisting of a series of wings or blades mounted in a spiral line on a vertical shaft or axis working in a cylinder, which shaft or axis, by its rotation, reduces the descending clay into a compact, firm, and uniform mass. The clay is then forced out of the mill through a mouth or orifice onto a table or bed, where the workman prepares it by molding it to its first form or shape, and then covering it entirely with brick or tile powder. In obtaining this powder a mill is employed, consisting of a heavy hard cone rolling horizontally in a circular or annular groove. The masses of clay thus shaped and covered with brick or tile powder are then carried to a drying-room situated, by preference, above the furnace or furnaces, into which the waste heat from the furnaces is directed. After drying for about three days, these masses of clay are placed in a screw or other press, in order to give them their definite shape, and at the same time submit them to an extra pressure. After this the products are again placed for about three days in the drying-room. They are then put into the furnaces, where they are baked for about five days.

The furnace employed for the above purposes is provided with a flat surface of refractory material, on which the articles to be fired or baked are placed. This surface is perforated with a number of openings, through which the products of combustion pass into flues, and then into a collector or main flue, which conducts them to the chimney.

Doors or dampers are employed for the purpose of regulating the passage of the products of combustion at will. A door or opening is also provided, through which the articles are placed in the furnace and removed therefrom. These doors or openings may be closed with bricks and clay or mortar or cement. Openings are also provided in the crown of the furnace to permit the heat to escape when the articles are sufficiently fired or baked. These openings must be opened very gradually, in order to avoid the too sudden cooling of the products, which would make them crack. The heat escaping through these openings is directed into the drying-rooms, which should be as much as possible over the furnace or furnaces, in order to take advantage of all the heat which they emit.

By the means above-described, bricks, slabs, and other articles may be made very dense and hard, and perfectly impermeable, as also capable of resisting extremes of heat and cold, thereby enabling them to be used for floors, sidewalks, passages, cellars, and other places, as also as substitutes for paving-stones for roads and streets.

And in order that the said invention may be more clearly understood and readily carried into effect, I will proceed to more fully describe the same, reference being had to the accompanying drawings, in which—

Figure 2:
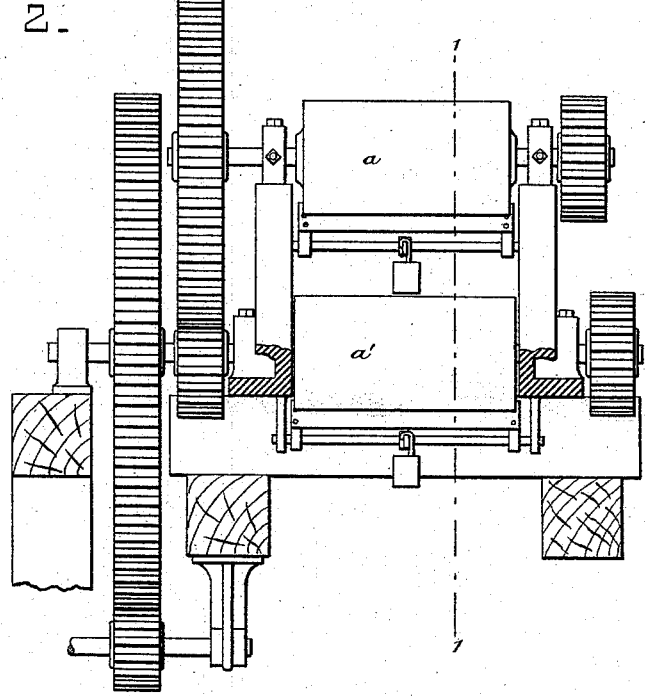

Figure 1 represents a sectional end view, and Fig. 2 a sectional front view, of a loam-crusher constructed according to the invention.

The clay or loam is first mixed or tempered with hot water, obtained, by preference, by passing the waste steam of a steam-engine into a tank containing the water to be heated. The water thus heated is conveyed by pipes or tubes, provided with regulating-cocks, to the clay to be tempered or mixed. The clay thus soaked is lifted by means of an endless or continuous elevator to the crushing or grinding mill, (represented in Figs. 1 and 2,) which, it will be seen, is provided with two pairs of crushing cylinders or rollers. The loam or clay is first delivered to the cylinders or rollers $a\ a$, and, after being crushed by them, falls on the cylinders or rollers $a'\ a'$, where it is ground or triturated the second time. The loam or clay is then submitted to the action of a vertical pug-mill, such as that represented in vertical section at Fig. 3 and in sectional plan at Fig. 4. The clay is introduced at the top of the mill, and is then worked by a series of wings or blades, $b$, mounted in a spiral line on a vertical shaft or axis, $b'$, working in a cylinder, which shaft or axis $b'$, by its rotation, reduces the descending clay or loam into a compact, firm, and uniform mass. The clay is then forced out of the mill through a mouth or orifice, $c$, onto a table or bed, where the workman prepares it by molding it to its first form or shape, and then covering it entirely with brick or tile powder. In order to obtain this powder, a mill is employed, consisting, by preference, of a heavy hard cone, rolling horizontally in a circular or annular groove. The masses of clay thus shaped and covered with brick or tile powder are then carried to a drying-room, situated, by preference, above the furnace or furnaces, into which the waste heat from the furnace is directed. After drying for about three days, these masses of clay or loam $d$ are placed in a screw-press, such as that shown in Figs. 5 and 6, which are respectively a side view and sectional end view of the same; but a press of other construction may be employed, in order to give them their definite shape, and at the same time submit them to an extra pressure. After this the products are again placed for about three days in the drying-room. They are then put into the furnaces, where they are baked for about five days.

Figure 8:
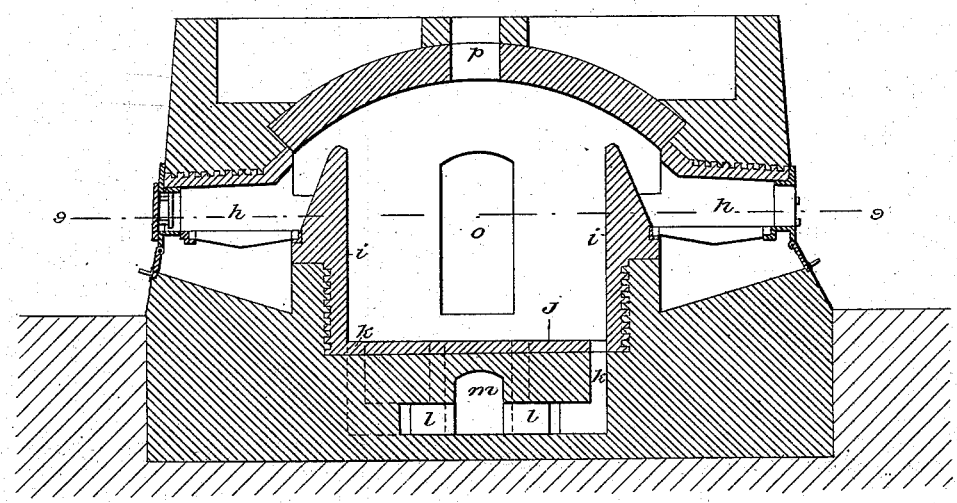
Figure 10:
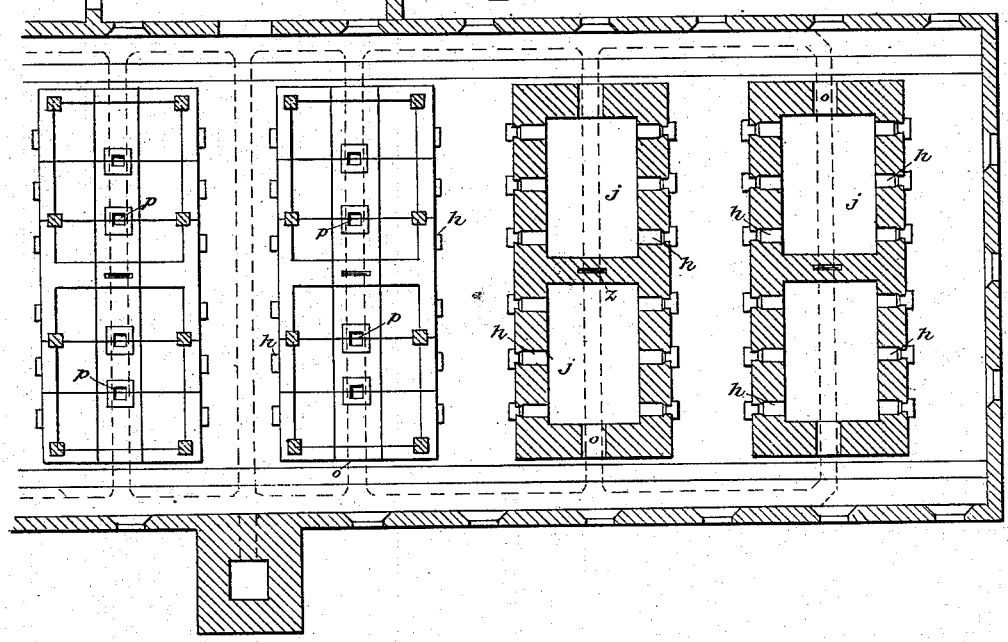

Fig. 7 represents two furnaces constructed according to the invention, that on the left being an outside view, and that on the right being a longitudinal section on the line $a\ b$ of Fig. 9. Fig. 8 is a transverse section of one of such furnaces, taken on the line $c\ d$ of Fig. 9. Fig. 9 is a horizontal section on the line $e\ f$ of Fig. 8, and Fig. 10 is a plan of a number of such furnaces arranged in a manner suitable for a single establishment.

$h$ are the fire-places which are to produce the heat for burning the products, placed in the oven $i$ on a flat surface, $j$, of refractory material. This surface is perforated with a number of openings, $k$, through which the products of combustion pass into the flues $l$, leading into a collector or main flue, $m$, which conducts them to the chimney $n$, as indicated by the arrows. The doors or dampers $z$ serve for interrupting the passage of the smoke and products of combustion at will. Through the doors or openings $o$ the articles are placed in the furnaces and removed therefrom. These doors or openings may be closed with bricks and clay or mortar or cement. Openings $p$ are provided in the crown of the furnaces to permit the heat to escape when the articles are sufficiently fired or baked. These openings $p$ may be closed in the same manner as the doors or openings $o$, and must be opened very gradually, in order to avoid the too sudden cooling of the products, which would make them crack. The heat escaping through these openings $p$ is directed into the drying-rooms, which should be as much as possible over the furnace or furnaces, in order to take advantage of all the heat which they may emit.

The part of the building shown at $s$ is intended for the reception of the machinery employed in the said invention.

Having thus described the nature of the said invention and the mode in which the same is carried into effect, what I claim, and desire to secure by Letters Patent, is—

1. The improved process of manufacturing bricks, tiles, and other similar articles, which consists in tempering, kneading, and compacting the clay, molding the same to a shape approximating that of the finished articles, covering these molded masses with powdered tiles, drying the same by heat, compressing the same in dies to the requisite shape and density, and finally firing them in a furnace at an intense heat, substantially as set forth.

2. The improved process of manufacturing bricks, tiles, and other similar articles, which consists in diluting or tempering the clay with heated water, crushing or grinding the diluted clay, kneading and compacting the same, molding the mass into a shape approximating that of the finished article, drying the molded products, pressing the same in a mold or die to the desired finished shape, and finally firing the articles, substantially as set forth.

3. In the manufacture of bricks, slabs, tiles, and other like articles, the combined processes of, first, diluting the loam or clay by heat; second, crushing and grinding the diluted clay by means of cylinders, crushers, or grinders; third, condensing the ground mass; fourth, subjecting the same to a primary compression into approximate shape; fifth, covering the products with brick, tile, or other similar powder; and, sixth, alternately drying and compressing the products before they are finally subjected to the process of burning, all substantially as herein set forth.

4. The combination, in a furnace composed of equidistant fire-places arranged at or near the arched roof and in relation to bridges and the sole of the furnace, as described, of openings in the sole arranged equidistantly from side to side, and so as to cause the products of combustion to descend uniformly through the mass by passing both against the walls and toward the centers, in combination with channels under the sole, conveying the products of combustion to a central flue below said channels and communicating with a chimney.

In witness whereof I have hereunto signed my name in the presence of two subscribing witnesses.

ANT. DIMPFL.

Witnesses:
 EMIL HENZEL,
 JOSEPH W. HARPER,
  *Both of Munich, Bavaria.*